US009175670B2

(12) United States Patent
Lockwood et al.

(10) Patent No.: US 9,175,670 B2
(45) Date of Patent: Nov. 3, 2015

(54) PRECAST CONCRETE POST TENSIONED SEGMENTED WIND TURBINE TOWER

(71) Applicants: James D. Lockwood, Boulder, CO (US); William D. Lockwood, Dayton, OH (US)

(72) Inventors: James D. Lockwood, Boulder, CO (US); William D. Lockwood, Dayton, OH (US)

(*) Notice: Subject to any disclaimer, the term of this patent is extended or adjusted under 35 U.S.C. 154(b) by 0 days.

(21) Appl. No.: 13/957,596

(22) Filed: Aug. 2, 2013

(65) Prior Publication Data

US 2014/0033628 A1    Feb. 6, 2014

Related U.S. Application Data

(60) Provisional application No. 61/742,070, filed on Aug. 3, 2012.

(51) Int. Cl.
*F03D 11/04*     (2006.01)
*E04H 12/16*    (2006.01)

(52) U.S. Cl.
CPC ............... *F03D 11/04* (2013.01); *E04H 12/16* (2013.01); *Y02E 10/728* (2013.01)

(58) Field of Classification Search
CPC ......... E04H 12/02; E04H 12/12; E04H 12/14; E04H 12/16
USPC ............. 52/40, 223.4, 223.5, 223.13, 223.14, 52/294, 295, 848
See application file for complete search history.

(56) References Cited

U.S. PATENT DOCUMENTS

| 909,299 | A | * | 1/1909 | Hilborn et al. | ............. 52/745.15 |
| 1,206,484 | A | * | 11/1916 | Swan | ............................. 52/223.3 |
| 5,858,493 | A | * | 1/1999 | Sandt | .......................... 428/36.91 |
| 6,851,231 | B2 | | 2/2005 | Tadros et al. | |
| 7,160,085 | B2 | | 1/2007 | De Roest | |
| 7,739,843 | B2 | | 6/2010 | Cortina-Cordero | |

(Continued)

FOREIGN PATENT DOCUMENTS

| DE | 613696 | 5/1935 |
| DE | 3115212 | 3/1988 |

(Continued)

OTHER PUBLICATIONS

English machine translation of the specification and claims for DE613696. May 27, 1935.

(Continued)

*Primary Examiner* — James Ference
*Assistant Examiner* — Joseph J Sadlon
(74) *Attorney, Agent, or Firm* — Holland & Hart, LLP

(57) ABSTRACT

A post-tensioned precast segmental concrete tower has a stack of annular segments with uniform cross-sections which varies over the tower height. The transition between tower segments occurs in stages and is achieved using annular members or segments which support and anchor post-tensioning tendons that transfer loads passing through the tower as a result of a change in tower geometry. The tower segments are match cast against one another in fabrication to create tight matching opposing surfaces when placed into the tower and to create tight joints. The match casting eliminates the need for grout between precast segments, resulting in a faster tower erection time and high durability of the joints. All annular segments have horizontal joints and no vertical joints. The tower geometry simplifies the formwork system used to precast the segments, and the post-tensioning tendons tie all segments together and to the foundation.

6 Claims, 9 Drawing Sheets

(56) References Cited

U.S. PATENT DOCUMENTS

| | | | |
|---|---|---|---|
| 7,752,825 | B2 | 7/2010 | Wobben |
| 7,770,343 | B2 | 8/2010 | Montaner Fraguet et al. |
| 8,220,212 | B2 | 7/2012 | Stiesdal |
| 8,458,970 | B2 | 6/2013 | Zavitz et al. |
| 8,484,905 | B2 * | 7/2013 | Skjaerbaek et al. ............... 52/40 |
| 8,567,131 | B2 * | 10/2013 | Ollgaard ........................... 52/40 |
| 2006/0254168 | A1 | 11/2006 | Wobben |
| 2010/0257811 | A1 | 10/2010 | Jakubowski |
| 2010/0325986 | A1 * | 12/2010 | Garc A Maestre et al. .. 52/223.3 |
| 2012/0043680 | A1 | 2/2012 | Knox et al. |
| 2012/0141295 | A1 | 6/2012 | Martinez De Castaneda et al. |
| 2013/0081350 | A1 | 4/2013 | Bogl et al. |
| 2014/0044554 | A1 * | 2/2014 | Lafferty .................... 416/244 R |
| 2015/0159634 | A1 * | 6/2015 | Ollgaard .................... 52/745.18 |

FOREIGN PATENT DOCUMENTS

| | | |
|---|---|---|
| DE | 29809541 U1 | 11/1999 |
| DE | 19823650 A1 * | 12/1999 |
| GB | 638089 A * | 5/1950 |
| WO | 0238953 | 5/2002 |
| WO | 2008136717 | 11/2008 |
| WO | WO2011/006526 | 1/2011 |
| WO | 2011091799 | 8/2011 |
| WO | 2011110749 | 9/2011 |

OTHER PUBLICATIONS

English abstract and English machine translation of the specification and claims for DE3115212. Mar. 31, 1988.

* cited by examiner

PRECAST CONCRETE POST TENSIONED SEGMENTED WIND TURBINE TOWER

BACKGROUND OF THE INVENTION

The existing methods of constructing wind towers vary depending on whether the materials are steel or concrete. The decision process used to select steel or concrete depends on the geographic location, regional resources and access to the wind farm site. Steel wind towers are commonly built through bolting of steel tubular sections together at intermediate flanges. The heights of steel towers are often limited by the diameter of the steel tubular sections that can be physically transported from the location of the steel fabricator to the wind farm site without significant modifications to existing roads, bridges, rail infrastructure, hauling equipment and other physical constraints. These limitations typically result in steel member diameters to approximately 20 ft., which in turn limits the tower height to approximately 300 ft. using conventional strength steel. Energy production from a wind tower has been typically shown to increase by increasing the height of the tower as a result of improved consistency in laminar wind flow. To increase the height of steel towers, some developers are installing concrete pedestals underneath the base of the steel tower.

Concrete towers being constructed today by using precast methods and cast in place methods. The advantages of concrete towers are they can be constructed using regional labor and materials and typically do not have height limitations as a result of transportation constraints since these towers can be fully fabricated on site. Cast in place construction methods utilize vertically extending formwork to support the pouring of fresh concrete into the forms at height. Restrictions to this method are the reduced speed of construction and sensitivity to inclement weather. Existing precast concrete techniques commonly precast the elements in a manner that results in vertical and horizontal joints, requiring joining of the elements during construction with grout. In this solution, post-tensioning in both directions can often be required to achieve a durable tower structure.

Other precast solutions involve the grinding of the annular horizontal concrete surfaces to achieve a quality load bearing connection. The segments are commonly precast offsite or nearby to the tower farm. The vertical post-tensioning is commonly located inside the concrete wall where it is anchored. The common geometry of a concrete wind tower is tapered, creating additional complexity in the forming system and placement of reinforcing and post-tensioning geometry. The challenges inherent to the existing steel and concrete tower designs and construction methods are their limitation on geometry in the case of steel towers and the complexity of the concrete towers.

SUMMARY OF THE INVENTION

This invention improves the construction of a precast concrete wind tower through its design and pre-casting methods. One primary feature of the invention is the forming of a stepped tower, whereby transition rings or annular anchor members or donut sections are used to transfer the post-tensioning tendon forces into the sections of the tower. The donut segments perform as intermediate diaphragm segments for the post-tensioning and transition zones for the change in tower diameter or horizontal cross-section. This feature eliminates the requirement for post-tensioning anchor blisters external to the inside of the tower wall to anchor the post-tensioning tendons. The axial loads and bending moments as a result of the step change in tower diameter or cross-section are resisted by the transition donut sections. The transition donut sections also allow for vertical tower sections having a constant or uniform geometry between the donut sections which significantly simplifies both the site pre-casting operation and the installation of the precast tower segments. Each precast segment is match-cast against the previously cast segment to achieve a match cast joint, eliminating the need for a secondary operation in the field to secure the joint mechanically or the need for using grout.

The tower structure segments are precast using match casting techniques where each segment connecting face is cast against its adjacent segment. Segments are typically designed to have similar weights, so that the lifting equipment used on site is optimized during the placement of segments. The tower segments may be uniform or constant in diameter or cross-section over a length of segments and between segment joints for producing segments for the stepped tower geometry or be tapered to result in a tapered tower shape where the top of the tower is a smaller diameter than its base and linearly tapered. The precast segments may be cast on site using a formwork system that is mobile. The formwork is designed and fabricated such that the end of the form is the actual segment previously cast, constituting the match cast face. The formwork can be moved to position it against each segment cast. As a segment is cast and after being used to match cast the next segment, it is moved from the immediate casting area to the casting yard for storage until used in the tower.

Alternatively, each tower segment being cast can be moved and the formwork held stationary during the match casting process. In both circumstances, segments are only required in the immediate casting area during casting or match casting. The number of forms required on site is a function of the casting production rate required. Only a limited amount of space (only two segments in length) is required to establish the match casting operation from one form. In all cases, a regional precaster may be used to fabricate the segments away from the site and then transport the segments to the site. However, it is considered advantageous to have the option to cast on site and to obtain concrete from a site operated batch plant or ready mix company. Precast segments are placed onto shims to level the base segment prior to stacking others on top. The base segment, once leveled, is then grouted between the precast base concrete segment and the foundation element.

To increase shear capacity across joint and align joints upon placement, shear keys are cast into the segments interfaces with the adjoining segment. To ease placement and create a tightly sealed seal between segments, epoxy is placed onto the joints prior to joining together. In a design option where tendons are located inside and adjacent the concrete wall, the epoxy also serves to better seal the joint during the grouting operation of the post-tensioning tendon ducts. When the precast segmental tower experiences external wind loads on the blade and tower structure, the bending moment existing at the base of the tower is largely resisted in tension by post-tensioning tendons that extend from the tower into the foundation element.

The use of post-tensioning tendons are used to reinforce the precast segmental tower at the most effective locations along the height of the tower to resist the tension in the tower under externally applied loads. The tendon locations are vertically tiered and anchored to provide the post-tensioning forces where loads are higher. Example: Where bending moments and resulting forces are higher towards the base of the tower under applied loads, the post-tensioning quantities are also higher to counter these applied loads. The tendons terminate over or along the height of the tower into the annular donut sections which act as internal diaphragms. External tendons to the concrete and inside the tower chamber may be used alone or in combination with internal tendons placed within tubes or ducts inside the concrete walls of the tower.

To facilitate any requirements for additional intermediate anchor zones for the vertically placed post-tensioning tendons, annular diaphragm rings or anchor members may be cast into the tower segments to anchor internal tendons. When external tendons are used, these diaphragm rings or members serve to anchor tendons and can also be used to deviate or terminate the tendons or allow them to pass through. For internal tendons within the concrete wall, the diaphragm ring or anchor member serves as an annular blister to the concrete where the tendon can exit the concrete wall and be stressed and anchored.

The connection of a steel tip adapter that supports the nacelle and blades is achieved using a precast segment that contains a concrete diaphragm cast into the segment. The top of this segment is flat in the area of the steel to concrete connection. In the event that a steel tower section, as in a hybrid tower, is placed above the precast concrete tower, the precast diaphragm segment is located just below the intersection of the two structures. The diaphragm segment is dimensioned such that its weight is compatible with the tower segment weights to optimize the crane or equipment used to install each segment. Other criteria that affects the geometry of the top diaphragm is the location of the bolt circle used to secure the nacelle of top tower section to the precast tower. To achieve an efficient transition of forces from the loads at top of the precast tower to the precast tower walls, the tendons anchored in the precast tower may be extended into the top of the diaphragm and anchored. The bolts connecting the nacelle or top tower section can then be anchored to the underside of the concrete diaphragm.

DESCRIPTION OF THE ILLUSTRATED EMBODIMENTS

Figure 1:
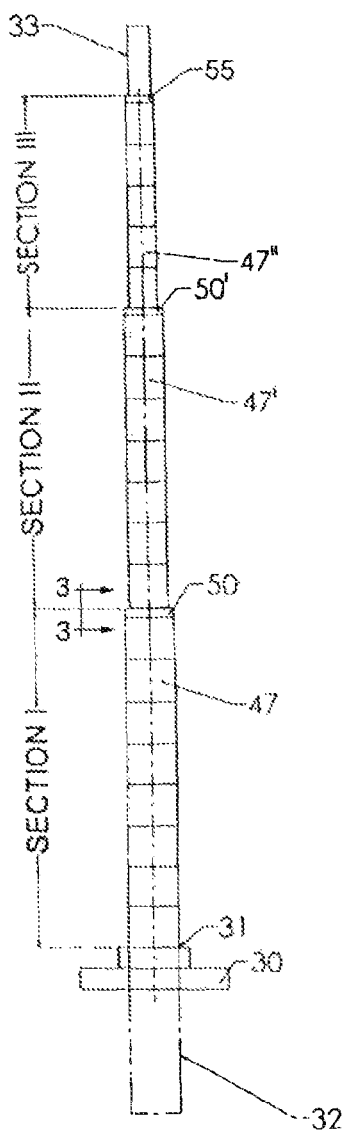
FIG. 1 is a stepped segmental concrete wind tower composed of precast concrete segments 47, 47' and 47, donut sections 50 and 50', a tip adapter 33, and a foundation type 30 or 32.
Figure 2:
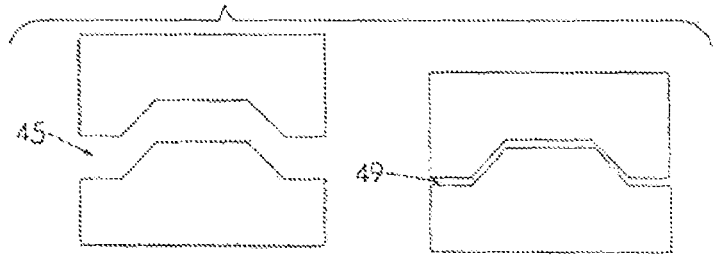
FIG. 2 illustrates a fragmentary section taken on the line 2-2 of FIG. 3 and showing a shear key configuration 49 which may be match cast and used to transfer shear across the segmental joints 29 under transverse loads to the tower and to assist in the alignment of one segment placed against the adjacent segment.

A stepped tower is shown in FIG. 1 and is assembled using annular and cylindrical precast concrete tower segments 47, 47' and 47" with transverse (horizontal) joints 29 (FIGS. 3 & 4) that are match cast together to achieve a precision fit between adjacent segments. The match cast joint detail 45 is shown in FIG. 2 and incorporates a shear key configuration used to transfer shear across the segmental joints under transverse loads to the tower and to assist in the alignment of one segment with each adjacent segment. Epoxy is applied onto the bottom surface of the joint 45 of FIG. 2 prior to closing the gap 49 between the two segments. The epoxy serves the purpose of a lubricant during the segment placement operation and also as a sealing of the joint after the epoxy cures.

Figure 3:
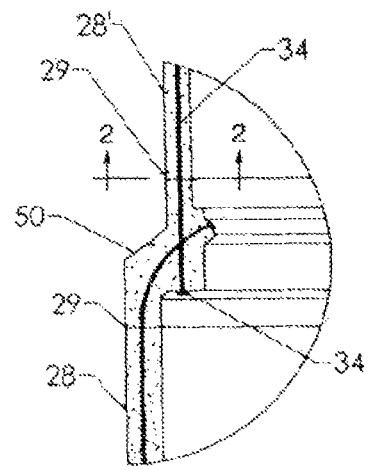
FIG. 3 is a fragmentary section taken on the line 3-3 of FIG. 1 and showing internal post-tensioning cables 34 connected to a transition donut section 50 with adjacent tower segments 28 and 28' attached by transverse shear key joints 29 that are match cast.
Figure 4:
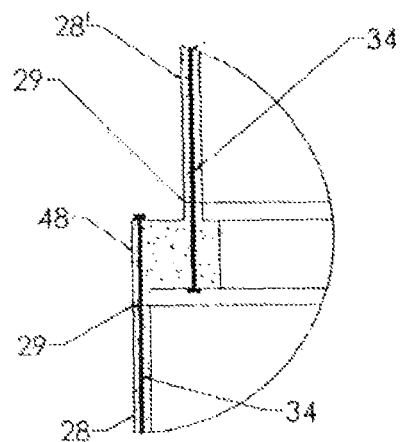
FIG. 4 is a fragmentary section of internal post-tensioning cables 34 connected to an alternate transition donut section 48 with adjacent segments 28 and 28' attached by transverse shear key joints 29 that are match cast.
Figure 5:
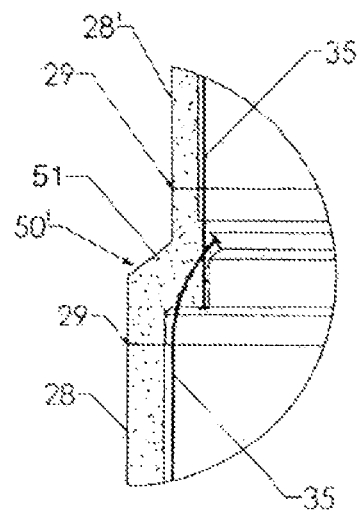
FIG. 5 is a fragmentary section of external post-tensioning cables 35 for a transition donut section 50' with adjacent tower segments 28 and 28' attached by transverse shear key joints 29 that are match cast.
Figure 6:
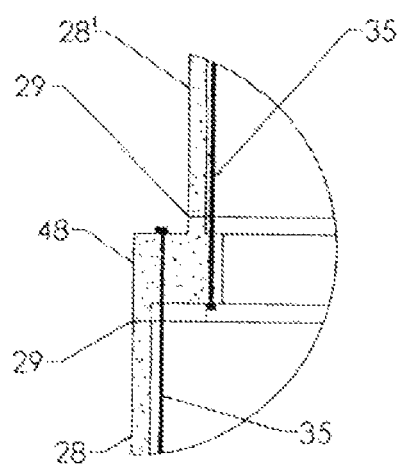
FIG. 6 is a fragmentary section of external post-tensioning cables 35 for an alternate transition donut section 48 with adjacent tower segments 28 and 28' attached by transverse shear key joints 29 that are match cast.

At each step or change in diameter of the tower structure, a transition annular donut member or segment or anchor member 48, 50 or 50' (FIGS. 3-6) transfers the forces through the geometry transition and also serves as an anchorage zone for the vertical post-tensioning tendons 34. The transition donut or anchor member may be used for internal post-tension tendons 34 located inside the concrete wall of the tower structure, as shown in FIGS. 3 & 4, or for external post-tensioning tendons 35, as shown in FIGS. 5 & 6 outside the tower wall within the tower chamber. The annular transition donut or anchor member 50 has a frusto-conical outer surface 51 (FIG. 5) and is also match cast at 29 against its adjacent tower segments 28 and 28' to provide a precision fit during installation of the segments. In the design of post-tensioning tendons 34 placed inside the tower wall (FIGS. 3 & 4), the tendons 34 below the transition donut segment 50 pass upwards through the donut segment and may either curve inwards to anchor inside the tower chamber, as shown in FIG. 3, or extend straight upwards, anchoring on the outside of the tower segment 48, as shown in FIG. 4. In the design of external post-tensioning tendons 35, as shown in FIGS. 5 & 6 within the tower, the tendons 35 enter the transition donut segment 50 from outside of the concrete tower wall and are placed close to or adjacent the wall.

Figure 7:
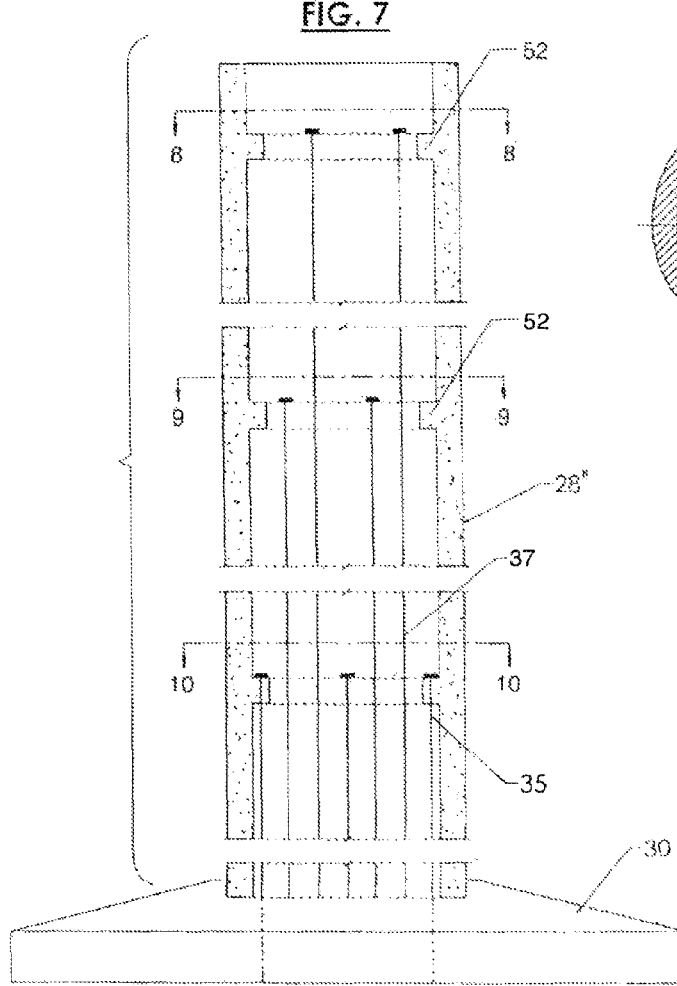
FIG. 7 is a vertical section of tower segments having annular diaphragm rings or anchor members where the external post-tensioning tendons 35 terminate or tendons 37 pass through the annular anchor members cast within the precast segments.
Figure 9:
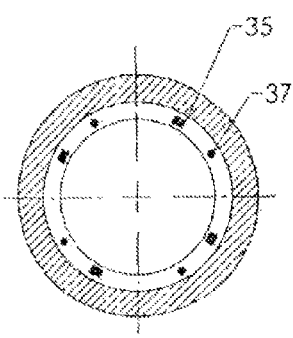
FIG. 9 is a section taken on the line 9-9 of FIG. 7 and showing where the external post-tensioning tendons 35 terminate or tendons 37 pass through the annular diaphragm or anchor member.
Figure 8:
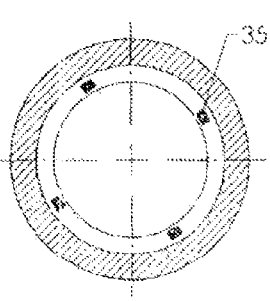
FIG. 8 is a section taken on the line 8-8 of FIG. 7 and showing where the external post-tensioning tendons 37 terminate.
Figure 10:
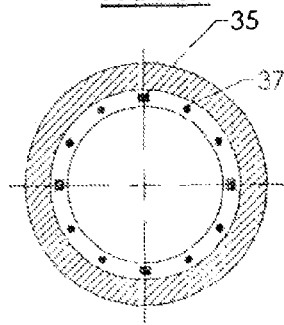
FIG. 10 is a section taken on the line 10-10 of FIG. 7 and showing where the external post-tensioning tendons 35 terminate or tendons 37 pass through the annular diaphragm or anchor member.
Figure 11:
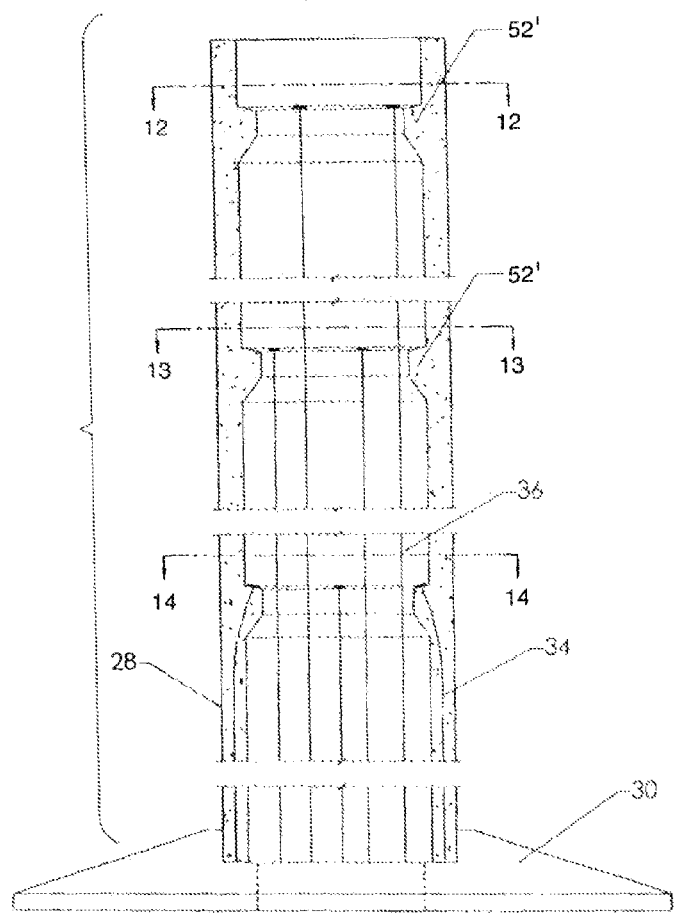
FIG. 11 is a vertical section of tower segments having annular diaphragm rings or anchor members where the internal post-tensioning tendons 34 terminate or pass through the annular diaphragms or anchor members located within the precast tower segments.
Figure 13:
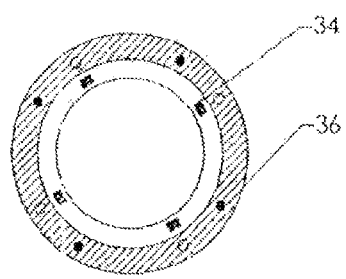
FIG. 13 is a section taken on the line 13-13 of FIG. 11 and showing where the internal post-tensioning tendons 34 terminate or tendons 36 pass through the annular diaphragm or anchor member.
Figure 12:
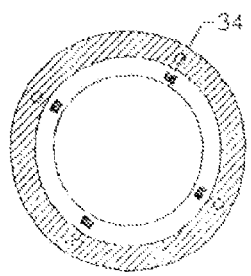
FIG. 12 is a section taken on line 12-12 of FIG. 11 and showing where the internal post-tensioning tendons 34 terminate.
Figure 14:
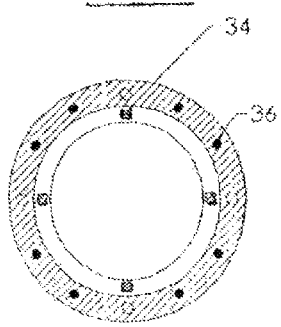
FIG. 14 is a section taken on line 14-14 of FIG. 11 and showing where the internal post-tensioning tendons 34 terminate or tendons 36 pass through the annular diaphragm or anchor member.

The most efficient layout of post-tensioning in the tower includes intermediate points to anchor the tendons 35. This is achieved by using annular internal and integral anchor members or diaphragm rings 52 or 52', as shown in FIGS. 7 & 11. For external post-tensioning, the anchorages or tendons 35 either terminate or pass through the annular anchor members or diaphragm rings 52 or 52' located within the precast segments. As a result of the increased bending moments at the base of the tower and reducing along the tower's height, a higher concentration of post-tensioning tendons 35 are shown in FIG. 10 than in FIGS. 8 & 9. The annular anchor member or diaphragm is cast directly into a tower segment with the tendon tubes or ducts located and incorporated into the segment. The annular diaphragm rings 52 or 52' may also serve as deviation points for the external tendons 35 if necessary to avoid equipment or other interferences located inside the tower structure near the walls. For internal post-tensioning as shown in FIG. 11, the annular anchor members or diaphragms rings 52' are located within a segment and its bottom shape may be tapered to follow the trajectory of the tendon and exiting the tower wall. The use of an annular diaphragm ring 52' allows the internal tendons 34 to exit the tower wall and anchor without having to deviate the tendon transversely within the tower wall to fixed location. This allows the post-tensioning to be more effective with reduced friction losses that commonly accompany tendon deviations. The higher concentration of tendons 34 and external tendons 36 in FIG. 14 in comparison to FIGS. 12 & 13 is a result of the higher bending moments that exist in the tower closer to the base 30.

Figure 15:
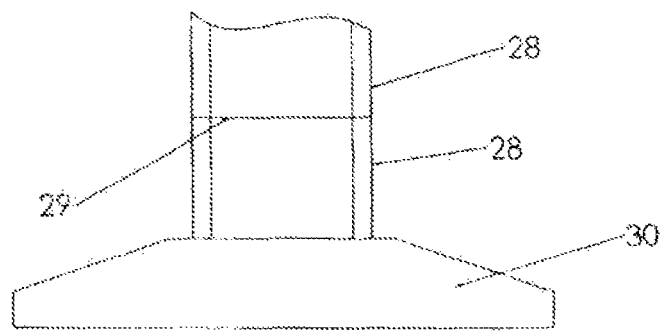
FIG. 15 is a fragmentary section of tower segments 28 attached to a foundation base 30.
Figure 16:
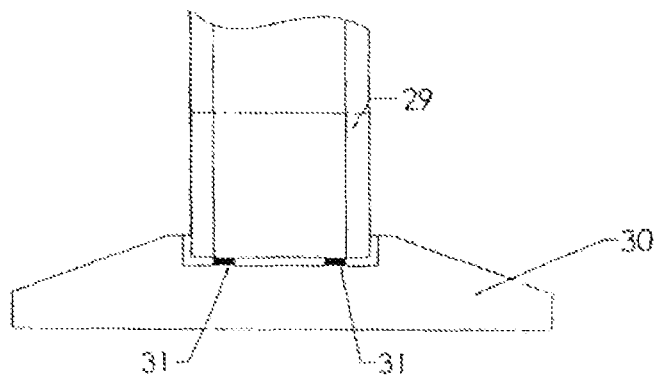
FIG. 16 is a fragmentary section of tower segments 28 seated on shims 31 on the foundation base 30 to properly align the vertical geometry prior to placing the subsequent segments above.
Figure 17:
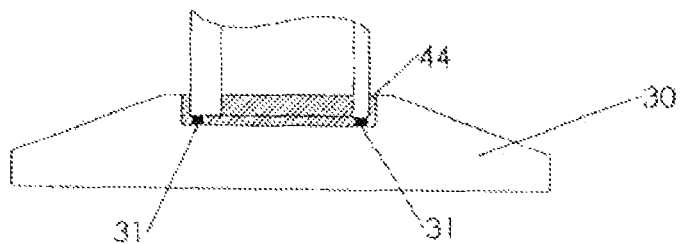
FIG. 17 is a fragmentary section of tower segments 28 with grout 44 poured between the bottom base precast segment 28 and the foundation base 30.

The bottom side of the base precast tower segment 28 of FIG. 15 is shimmed with shims 31, as shown in FIG. 16, engaging the foundation structure 30 to properly align the vertical geometry prior to placing the subsequent tower segments above. Once aligned, grout 44 (FIG. 17) is poured between the bottom of the base precast segment and the foundation structure 30. A shallow recess or trough formed within the top of the foundation during the foundation concrete pour can be used to contain the grout and fill the void between the bottom of the precast base tower segment 28 and the foundation 30.

Figure 18:
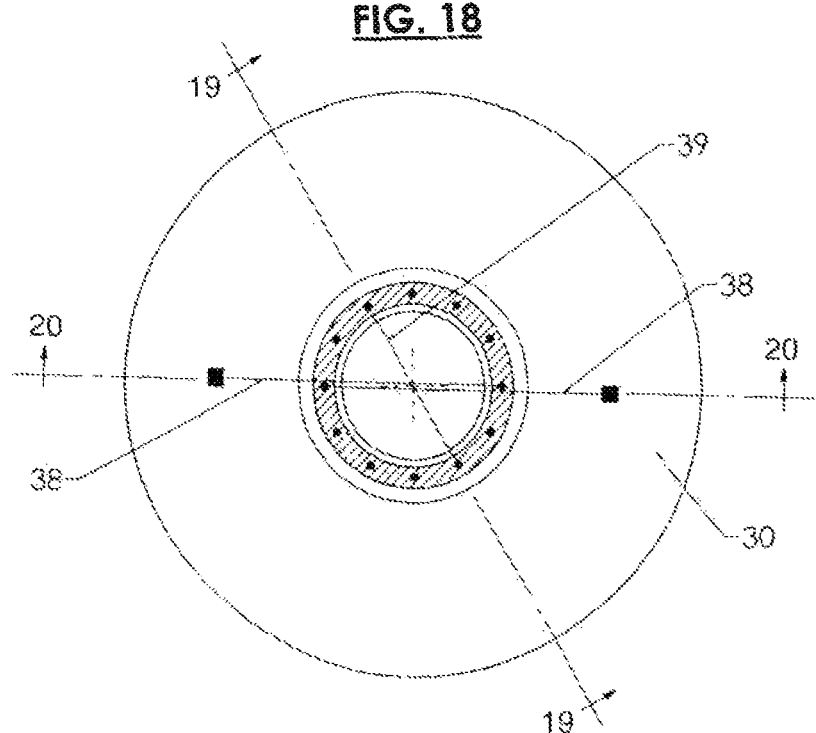
FIG. 18 is a plan view of a base 30 and showing the tendons 38 that connect the tower structure to the foundation base.
Figure 19:
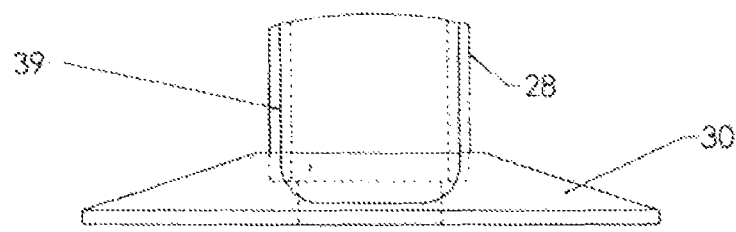
FIG. 19 is a fragmentary section taken on the line 19-19 of FIG. 18 and showing the connection of the bottom tower segment 28 to the foundation base 30 with U-shape hoop portions 39 of the tendons.
Figure 20:
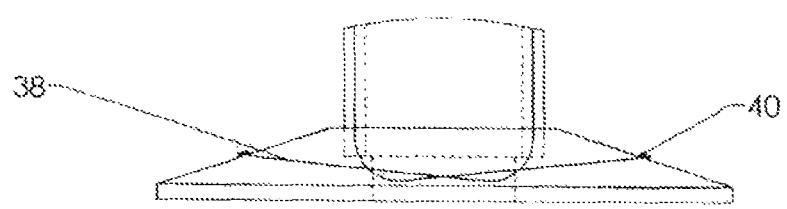
FIG. 20 is a fragmentary section taken on the line 20-20 of FIG. 18 and showing the connection of the bottom tower segment 28 to the foundation base 30 with tendons 38 having L-shape configuration and terminating at the outside of the foundation with terminals 40.

The geometry of the tendons shown in FIG. 18 that connect the tower structure to the foundation structure 30 are comprised of either a U-shape hoop configuration 39 (FIG. 19) or an L-shape hook configuration 38 shown in FIG. 20. In the hoop configuration, both ends of the same tendon are stressed from the anchorages located inside the tower structure. A benefit of the tendon configuration of FIG. 20 is that the compressive force of the tendons reduces the shear stresses in the concrete foundation structure 30 when the tendons hook back upwards and have terminals 40 on the surface the foundation 30. A benefit of the tendon configuration of FIG. 19 is that the hoop tubes or ducts for the tendons occupy less space in the foundation structure 30 than the ducts for the tendons 38 shown in FIG. 20. In both tendon configurations, the tendons 38 & 39 will typically be stressed from the anchorages inside the tower. The L shaped tendon 38 shown in FIG. 20 can be stressed both from the inside of the tower and from the face of foundation to maximize the force in the tendon in the foundation structure. These tendons for both configurations can also be stressed from the top of the precast concrete segment 51 shown in FIGS. 1, 21 & 23.

Figure 21:
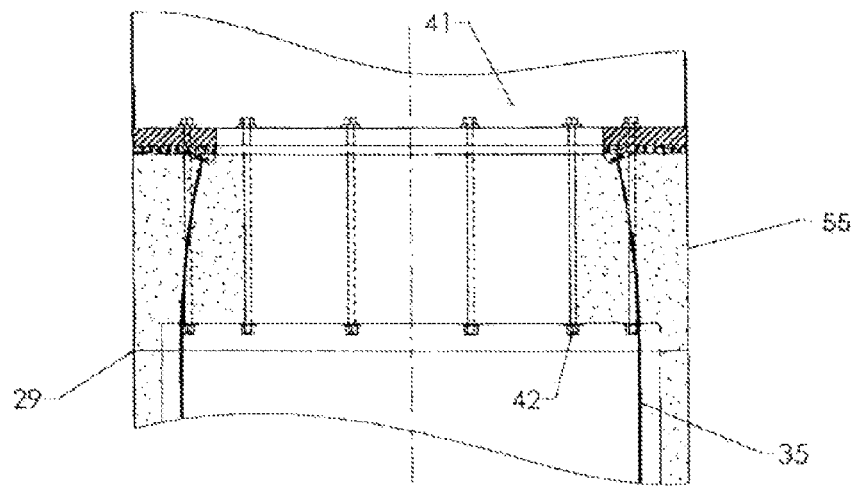
FIG. 21 is a fragmentary section taken on the line 21-21 of FIG. 22 and showing precast segment 55 where a nacelle 41 for the tip adapter 33 attaches to the tower structure with external post-tensioning tendons 35.
Figure 22:
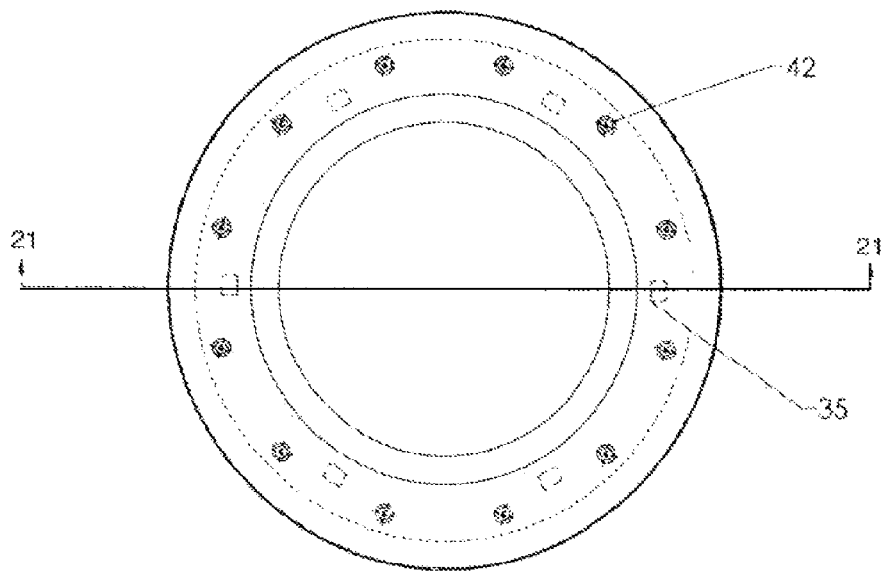
FIG. 22 is a plan view of FIG. 21 and depicting how anchor rods or bolts 42 attach the nacelle 41 and tip adapter 33.
Figure 23:
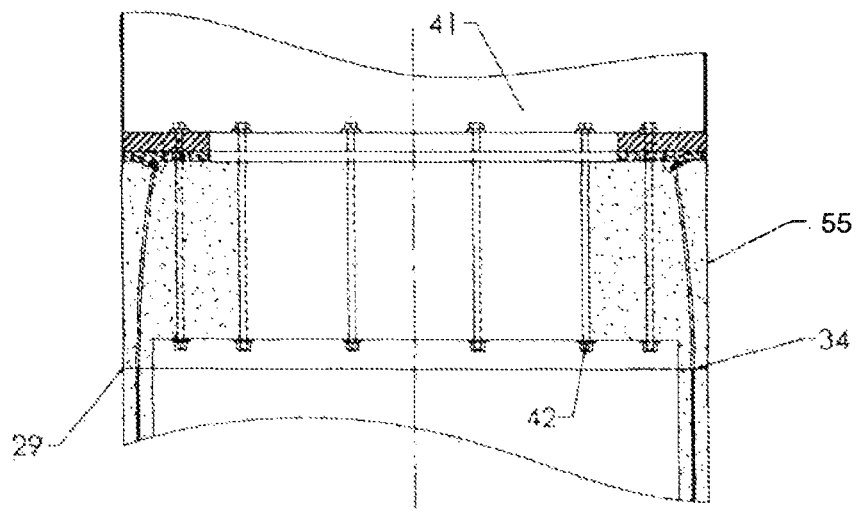
FIG. 23 is a fragmentary section taken on the line 23-23 of FIG. 24 and showing precast segment 55 with the nacelle 41 and tip adapter 33 attached to the tower structure with the internal post-tensioning tendons 34.
Figure 24:
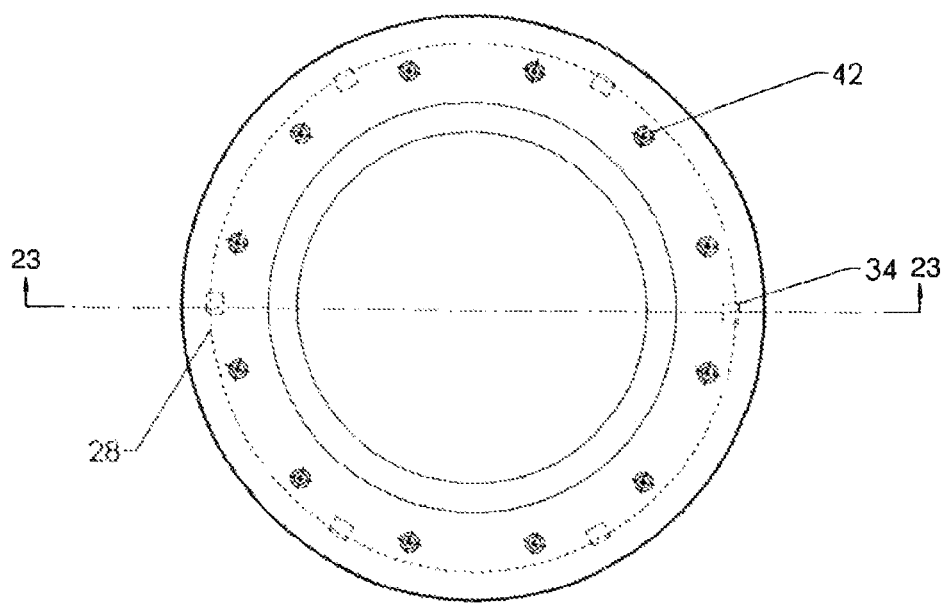
FIG. 24 is a plan view of FIG. 23 and depicting how the anchor rods 42 attach the tip adapter 33.

The top precast segment 55 of the tower, shown in FIGS. 1, 21 & 23, connects the tower structure to a tip adapter 33 (FIG. 1) provided by the turbine supplier. The connection is accomplished by anchoring the post-tensioning tendons 34 or 35 into a recess or cavity on top of the segment 55 and using anchor rods or bolts 42 to connect the steel flange ring 41 of the tip adapter 33 to the underside of the segment 55. This connection is applicable for both external tendons 35 of FIGS. 21 & 22 and internal tendons of FIGS. 23 & 24. To provide access from inside the tower to the inside of the tip adapter, a diaphragm opening is provided.

Figure 25:
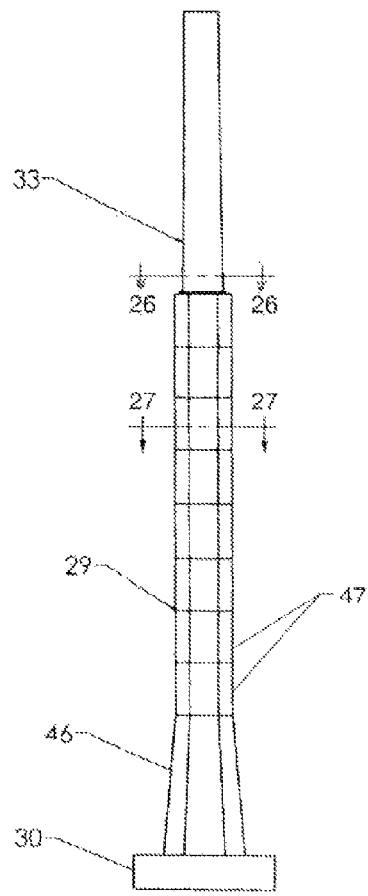
FIG. 25 shows another embodiment or a hybrid tower that uses match casting concrete tower segments supporting a steel tower 33 with the bottom tower segment placed on top of a precast or cast-in-place concrete pedestal 46.
Figure 27:
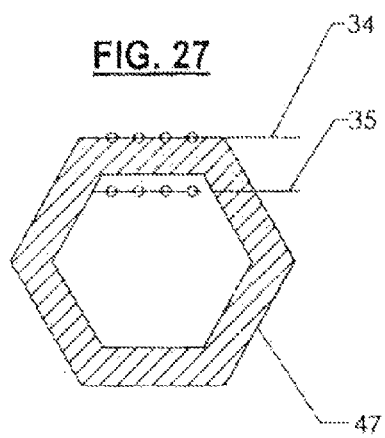
FIG. 27 is a section taken on line 27-27 of FIG. 25 and showing match cast segments having internal and external post-tensioning tendons 34 & 35.
Figure 26:
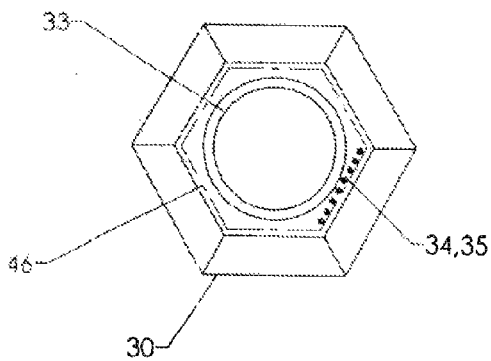
FIG. 26 is a section of the tower taken on the line 26-26 of FIG. 25 and having match cast segments with flat sides to form either the stepped tower of FIG. 1 or the hybrid tower of FIG. 25.

The use of match casting segments can be used to construct a hybrid tower whereby a steel tower 33 (FIG. 25) and tower segments 47 are placed on top of a precast concrete pedestal 46 shown in FIG. 25. The cross sectional geometry of the annular match cast segments may be round (FIG. 1) or flat sided (FIG. 26) for the stepped tower of FIG. 1 or the hybrid tower of FIG. 25. In the case of a flat sided tower, the post-tensioning tendons 34 or 35 are located along the flat sides of the tower as shown in FIGS. 26 & 27. These tendons can be designed for placement inside the tower wall or external to the tower wall, according to the space available inside the tower. When using the flat walls of FIG. 27, the tower may be tapered more easily than a round or cylindrical structure. Using flat walls, a tapered tower section 46 is provided as the base section before changing to a constant or uniform cross-sectional geometry.

While the forms of segmental wind turbine towers herein described constitute preferred embodiments of the invention, it is to be understood that the invention is not limited to these precise forms, and that the changes made therein without departing from the scope of the invention as defined in the appended claims

The invention claimed is:

1. A vertical precast concrete stepped tower adapted for supporting a wind turbine, comprising
    a base member positioned to support said tower,
    a first plurality of substantially identical precast concrete annular and cylindrical lower tower segments having the same diameter and supported by said base member to form a vertical stack of successive said lower tower segments,
    a first precast concrete annular and circular transition segment mounted on top of said stack of said lower tower segments, with said first transition segment having a frusto-conical outer surface,
    a second plurality of substantially identical precast concrete annular and cylindrical intermediate tower segments having a diameter smaller than said diameter of said lower tower segments,
    said annular intermediate tower segments arranged to form a second vertical stack of successive said intermediate tower segments on top of said first precast concrete transition segment,
    a second precast concrete annular and circular transition segment mounted on top of said stack of intermediate tower segments, with said second transition segment having a frusto-conical outer surface,
    a third plurality of substantially identical precast concrete annular and cylindrical upper tower segments having a diameter smaller than said diameter of said intermediate tower segments,
    said upper tower segments arranged to form a third vertical stack of successive upper tower segments on top of said second precast concrete transition segment, and
    a series of vertically extending post tensioning tendons positioned within a chamber defined by said first, second and third plurality of said annular tower segments and each said transition segment and connecting all of said annular tower segments and said annular transition segments together,
    match-cast annular joints between said annular tower segments, the joints comprising:
        a flat annular surface proximate an outer surface of the annular tower segments, and
        an inclined annular surface is contiguous with the annular flat surface and forms an obtuse angle with respect to the flat annular surface wherein the inclined annular surface is spaced apart from the outer surface of the annular tower segment.

2. A precast concrete tower according to claim 1 wherein adjacent said precast annular tower segments in each said stack and each said precast annular transition segment adjacent said tower segments are connected by annular match-cast opposing surfaces forming precision annular joints between all of said adjacent segments.

3. A precast concrete tower according to claim 2 wherein said annular match-cast opposing surfaces of all of said adjacent precast annular tower segments and all of said precast annular transition segments have interfitting tapered shear keys.

4. A precast concrete tower according to claim 1 wherein each said vertical stack of annular and cylindrical tower segments includes at least five of the corresponding said tower segments of the same diameter.

5. A vertical precast concrete stepped tower adapted for supporting a wind turbine, comprising
    a base member positioned to support said tower,
    a first plurality of substantially identical precast concrete annular and cylindrical lower tower segments having the same diameter and supported by said base member to form a vertical stack of successive said lower tower segments,
    a first precast concrete annular and circular transition segment mounted on top of said stack of said lower tower segments, with said first transition segment having a frusto-conical outer surface,
    a second plurality of substantially identical precast concrete annular and cylindrical intermediate tower segments having a diameter smaller than said diameter of said lower tower segments,
    said annular intermediate tower segments arranged to form a second vertical stack of successive said intermediate tower segments on top of said first precast concrete transition segment,
    a second precast concrete annular and circular transition segment mounted on top of said stack of intermediate tower segments, with said second transition segment having a frusto-conical outer surface,
    a third plurality of substantially identical precast concrete annular and cylindrical upper tower segments having a diameter smaller than said diameter of said intermediate tower segments,
    said upper tower segments arranged to form a third vertical stack of successive upper tower segments on top of said second precast concrete transition segment,
    adjacent said precast annular tower segments in each said stack and each said precast annular transition segment adjacent said tower segments being connected by annular match-cast opposing surfaces forming precision annular joints between all of said adjacent segments,
    said annular match-cast opposing surfaces of all of said adjacent precast annular tower segments and all of said precast annular transition segments having interfitting tapered shear keys,
    match-cast annular joints between said annular tower segments, the joints comprising:
        a flat annular surface that proximate an outer surface of the annular tower segments, and
        an inclined annular surface that is contiguous with the annular flat surface that forms an obtuse angle with respect to the flat annular surface and
    a series of vertically extending post tensioning tendons positioned within a chamber defined by said first, second and third plurality of said annular tower segments and each said transition segment and connecting all of said annular tower segments and said annular transition segments together.

6. A precast concrete tower according to claim 5 wherein said second precast concrete annular transition segment includes an inner annular portion receiving and confining said post tensioning tendons.

* * * * *